Nov. 21, 1950          G. H. POHM          2,530,784

ELECTRIC CONTROL CIRCUIT

Filed Oct. 17, 1947

INVENTOR.
GEORGE H. POHM
BY *Woodling and Krost*
ATTORNEYS.

Patented Nov. 21, 1950

2,530,784

UNITED STATES PATENT OFFICE 2,530,784

ELECTRIC CONTROL CIRCUIT

George H. Pohm, Lorain, Ohio, assignor to Lorain Products Corporation, a corporation of Ohio Application October 17, 1947, Serial No. 780,416

4 Claims. (Cl. 321—6)

This invention deals with an electric control circuit and in particular with a rectifying arrangement for supplying a regulated direct current output and for controlling the value of the output voltage by means of a small D. C. control current.

It is an object of this invention to provide a source of constant voltage rectified current which will be independent of variations in the voltage of the alternating current source.

Another object of my invention is to regulate the value of the rectified output voltage by means of a controlling current.

Another object of my invention is to control the output voltage of a regulated rectifying arrangement by means of a weak unidirectional control current and to prevent the power which is being controlled from entering the controlling source.

Other objects and a better understanding of my invention may be had by referring to the following description and claims, taken in conjunction with the accompanying drawing, in which:

Figure 1:
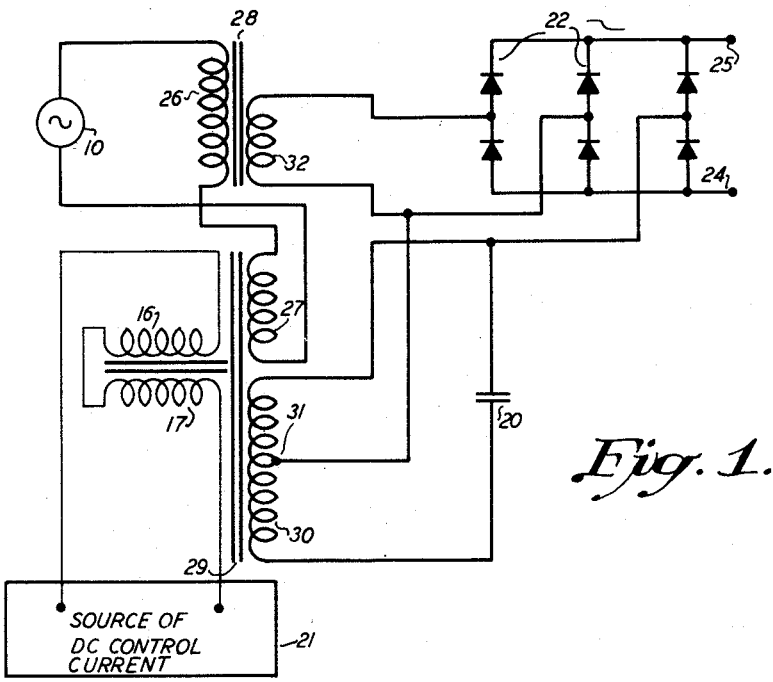
Figure 1 shows a schematic diagram of an embodiment of my invention.

My invention comprises a circuit for maintaining a constant voltage at the output of a rectifier which is energized from a single-phase source of alternating curent even though the voltage of the alternating current source may fluctuate and even though the current drawn from the direct current ouput terminals varies. My invention further makes its possible to control the value of the regulated rectified output voltage by the application of a weak unidirectional control current. The arrangement by which these functions are carried out will be understood best by referring to Figure 1, which shows a schematic diagram of an embodiment of my invention, and Figure 2 which is a diagram of the structure of one of the components of Figure 1. The circuit of Figure 1 comprises a transformer or reactor 28 in series with a saturable transformer 29. The winding 26 on the transformer or reactor 28 is connected in series with the winding 27 on the transformer 29 and energized from the source of alternating current 10. The secondary winding 30 on the transformer 29 has the condenser 20 connected across it, and one end of the secondary winding 32 on the transformer 28 is connected to the tap 31 on winding 30. The polyphase rectifier 22 is energized from winding 32 and also from winding 30.

The transformer 29 is designed to saturate in normal operation, and to aid in producing this result, the capacitor 20, which is connected across winding 30, provides magnetizing current for the transformer core. The transformer 28 may have a relatively linear magnetization characteristic, whereby the variations in the voltage of source 10 are absorbed by the winding 26 and the voltage across the winding 27 remains relatively constant as determined by the saturation of the transformer core.

When a load is connected across the direct current output terminals 24 and 25 of the rectifier 22, a phase shift is produced between the voltage across winding 30 and the voltage across winding 32. By suitably proportioning the circuit elements, it is possible to take advantage of this phase shift to cause a gradual change from single-phase rectification at light loads to polyphase rectification at heavy loads. As is well known, the use of polyphase rectification provides a higher rectified output voltage than does single-phase rectification for a given A. C. input voltage. This arrangement is therefore capable of providing a higher rectified voltage at heavy loads than at light loads. In actual practice, the increase in voltage may be adjusted to counteract the voltage drops in the various circuit elements and a constant value of rectified output voltage may be obtained at the output terminals 24 and 25. As previously stated, the variation in the voltage of source 10 produces relatively little change in the voltage across winding 30, because of the saturation of the core of the transformer 29. The operation of the circuit, therefore, is substantially the same regardless of the voltage of source 10, and the output voltage at terminals 24 and 25 remains substantially constant for wide variations in the voltage of source 10.

Figure 2:
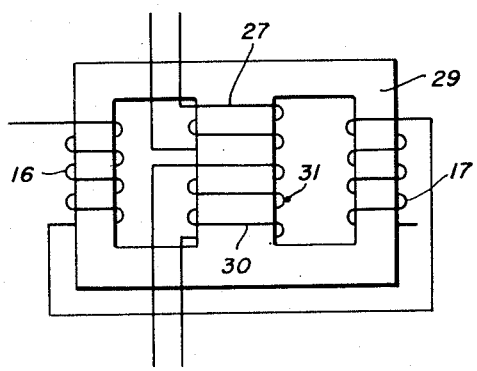
Figure 2 shows a diagram of the structure of one of the components of Figure 1.

The saturable transformer 29 utilized in my invention employs a three-legged core as indicated by the T shaped core symbol in Figure 1, in which the cross-bar of the T represents the central member of the three-legged core and the stem of the T represents the two outer core members. Figure 2 is a diagram of the structural arrangement of the transformer 29, and shows the windings 27 and 30 on the central member of the three-legged core structure, the winding 16 on the one outer core member, and the winding 17 on the other outer core member. The windings 16 and 17 on the two outer core members are connected in series to the source 21 of D. C. control current which may comprise a rectifier system wherein the output voltage of the system is responsive to a variable condition, such for example as temperature, or may comprise any electrical circuit in which the D. C. potential supplied at the output terminal is responsive to a variable condition. Thus, a variation in the voltage across the terminals of the source of D. C. control current 21 when acting upon the windings 16 and 17 produces a variation in the voltage across terminals 24 and 25. The windings 16 and 17 are preferably substantially alike and polarized to cancel voltages induced in them from winding 30. That is to say, the voltage induced in winding 17 is substantially equal and opposite to the voltage induced in winding 16 so that the A. C. voltage from winding 30 is not impressed upon the source 21. This relationship is referred to as a conjugate relationship between the winding 30 and the windings 16 and 17. Although the conjugate relationship provides a cancellation of the fundamental component of voltage in the control windings, there may remain a voltage of the second harmonic of the source frequency. When accurate adjustment of the output voltage is desired, it is preferable to minimize the power dissipation at the second harmonic frequency. If the source 21 has either a very high impedance or a very low impedance to this frequency, the power dissipation will be small. When the impedance is high, an effective open circuit to the harmonic may be established and the losses minimized, whereas a very low impedance or short circuit to the harmonic likewise avoids unnecessary losses at the harmonic frequency. The transformer 29 is saturated by the alternating current from source 10 in normal operation, but it may also be saturated by the unidirectional current from source 21 flowing through windings 16 and 17. The effective permeability of the core of transformer 29 can be controlled by the variation of the amount of current supplied by source 21. As the current from source 21 increases, it saturates the core of transformer 29 to a higher degree, and thereby reduces the effective permeability of the core. The voltage appearing across winding 30 is likewise controlled by this D. C. control current. Since two of the three phases of the voltage supplied to the rectifier 22 depend upon the voltage from winding 30, a change in this voltage results in a change in the rectified output voltage at terminals 24 and 25. By supplying a very small amount of control power from source 21, the output voltage at terminals 24 and 25 may be reduced, and at the same time the regulating properties of the circuit are maintained substantially unaltered.

The supply of larger values of control current reduces the output voltage further, aided by an amplifying action which depends upon capacitor 20 across winding 30. The capacitor 20 provides magnetizing current to saturate the transformer 29, and when the voltage across winding 30 is reduced the magnetizing current flowing through capacitor 20 is likewise reduced. This action is cumulative or regenerative, and any reduction in the voltage across winding 30 results in a further reduction in the current through capacitor 20 which in turn tends to reduce the voltage still further. Because of this action the sensitivity of my control circuit is increased and a considerable amount of power can be controlled at the output terminals 24 and 25 by a very small amount of power from control source 21.

For overload protection to prevent excessive current from flowing through the rectifier 22, the source 21 may be interconnected with the output load circuit, which will make it responsive to the output current of the arrangement to reduce the output voltage when the load resistance falls below a normal range of values, so that the load current remains in a safe operating range.

When my circuit is used to compensate for variations in ambient temperature, the source 21 is responsive to the temperature which is to be corrected for, and thus supplies a current to windings 16 and 17 to correct for such variations.

My control circuit is particularly applicable for use as a reference potential source for a larger rectifying system such as that described in a U. S. patent application by H. M. Huge entitled "Battery Charger," which application is being filed concurrently herewith and assigned to the same assignee. In this case the reduction in output voltage may be employed to limit the output current of the larger system, and the source 21 may be interconnected with the larger system to respond to the output current of the larger system. Thus, when an overload occurs on the larger system, a control current is supplied to the windings 16 and 17 to reduce the output voltage of the reference source.

Although my device is extremely sensitive and responsive to small values of current through the windings 16 and 17, nevertheless large values of current may be passed through these windings without damaging the circuit components. This is true because even though the core of transformer 29 may become highly saturated by the unidirectional control flux, nevertheless the voltage of source 10 may be sustained across the transformer winding 26 without causing excessive current to pass through the windings 26 and 27.

Although I have described my invention with a certain degree of particularity, it is understood that the present disclosure has been made only by way of example and that numerous changes in the details of construction and the combination and arrangement of parts may be resorted to without departing from the spirit and the scope of my invention as hereinafter claimed.

I claim as my invention:

1. A rectifying arrangement comprising in combination, first and second transformers having reactance associated with them and having their primary windings connected in series and adapted for energization from a single-phase source of alternating current, and having their secondary windings connected to the input terminals of a polyphase rectifyer from which a load can be supplied with rectified current, a capacitor connected in parallel with one of said windings on the second transformer, said second transformer being saturable, said transformers supplying said polyphase rectifier with polyphase current at the normal loading of the device, said second transformer having a plurality of saturable core members, winding means on at least one of said saturable core members on said second transformer in conjugate relationship to the primary winding of the second transformer, said winding means being adapted to be energized by a source of direct current, whereby the rectified output voltage is controlled by the current from said source of direct current.

2. In combination, first and second transformers, said second transformer having a plurality of saturable magnetic core members, a capacitor, a polyphase rectifier, an input circuit including windings on each of said transformers adapted to be energized in series from a source of single-phase alternating current, a winding on the second transformer, said capacitor being connected across said winding, an output circuit comprising windings on said first and second transformers connected to said polyphase rectifier, a control circuit comprising a source of direct current and winding means on at least one of said magnetic core members on the second transformer, whereby a unidirectional flux may be produced in said second transformer, said winding means being in conjugate relationship to said winding on the second transformer to control the rectified output voltage from said polyphase rectifier.

3. In combination, a first transformer, a second transformer, said second transformer having a core comprising a plurality of saturable portions, a capacitor, a polyphase rectifier, first winding means on said first transformer, second winding means on said second transformer, an input circuit including said first and second winding means in series and adapted to be energized from a single-phase source of alternating current, third winding means on the second transformer in conjugate relationship to said second winding means, source means for impressing a unidirectional current on said third winding means, a capacitor connected substantially in parallel with at least a portion of said second winding means, a polyphase rectifier adapted to be energized from said first and second winding means, said third winding means when energized by said source means being adapted to produce a unidirectional flux in said plurality of saturable core portions to control the output voltage of said polyphase rectifier.

4. A rectifying arrangement comprising first and second transformers connected in series with each other in a primary circuit and to the input terminals of a polyphase rectifier in a secondary circuit, said second transformer being saturable and comprising a plurality of magnetic flux paths, first and second winding means on the second transformer, said first and second winding means being in conjugate relationship to each other, a capacitor connected in parallel with said first winding means, and means for supplying a unidirectional current to said second winding means to control the output voltage of said polyphase rectifier.

GEORGE H. POHM.

REFERENCES CITED

The following references are of record in the file of this patent:

UNITED STATES PATENTS

| Number | Name | Date |
|---|---|---|
| 2,364,558 | Stocker | Dec. 5, 1944 |